US010042970B2

(12) United States Patent
Pandey et al.

(10) Patent No.: US 10,042,970 B2
(45) Date of Patent: Aug. 7, 2018

(54) SHARING GLOBAL ROUTE TOPOLOGIES IN DETAILED ROUTING

(71) Applicant: International Business Machines Corporation, Armonk, NY (US)

(72) Inventors: Diwesh Pandey, Bangalore (IN); Sven Peyer, Tuebingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/191,576

(22) Filed: Jun. 24, 2016

(65) Prior Publication Data

US 2017/0371996 A1 Dec. 28, 2017

(51) Int. Cl.
G06F 17/50 (2006.01)

(52) U.S. Cl.
CPC ...... *G06F 17/5077* (2013.01); *G06F 17/5081* (2013.01)

(58) Field of Classification Search
CPC ............ G06F 17/5077; G06F 17/5072; G06F 17/5054; G06F 17/5081; G06F 2217/08; G06F 2217/78; G06F 17/5031; G06F 17/5068; G06F 2217/68; G06F 9/5066; G06F 17/505; G06F 2217/06; G06F 2217/62
USPC ................................. 716/110–117, 126–131
See application file for complete search history.

(56) References Cited

U.S. PATENT DOCUMENTS

| 5,825,659 | A | 10/1998 | Nguyen et al. | |
|---|---|---|---|---|
| 8,635,577 | B2 | 1/2014 | Kazda et al. | |
| 2006/0288323 | A1* | 12/2006 | Birch | G06F 17/5077 716/129 |
| 2007/0106969 | A1* | 5/2007 | Birch | G06F 17/5077 716/113 |
| 2008/0028352 | A1* | 1/2008 | Birch | G06F 17/5077 716/112 |

OTHER PUBLICATIONS

Diwesh Pandey et al., Pending U.S. Appl. No. 15/438,887 entitled "Sharing Global Route Topologies in Detailed Routing," filed with the U.S. Patent and Trademark Office on Feb. 22, 2017.
List of IBM Patents or Patent Applictions Treated As Related; (Appendix P), Filed Feb. 22, 2017, 2 pages.

(Continued)

*Primary Examiner* — Binh Tat
(74) *Attorney, Agent, or Firm* — Cantor Colburn LLP

(57) ABSTRACT

According to an aspect, a method includes accessing an initial layout of global wires and a congestion related metric for each net in a gate level design description of an integrated circuit. A second layout is accessed that specifies, for each net, detailed routing information that includes connections between specific wires in the regions of the integrated circuit. A list of nets with a same source region and target region in the initial layout as the failing net is generated. A net in the list of nets is selected and the failing net is rerouted over the selected net. The rerouting includes the global router updating the initial layout and the detailed router updating the second layout. The congestion related metric for each net is updated in response to the global router updating the initial layout.

12 Claims, 7 Drawing Sheets

(56) References Cited

OTHER PUBLICATIONS

Chang et al., "NTHU-Route 2.0: A Fast and Stable Global Router", Department of Computer Science, International Conference on Computer Aided Design, 2008, 6 pages.
Zhang et al., "RegularRoute: An Efficient Detailed Router Applying Regular Routing Patterns," IEEE Transactions on Very Large Scale Integration (VLSI) Systems, vol. 21, No. 9, Sep. 2013, 14 pages.

* cited by examiner

SHARING GLOBAL ROUTE TOPOLOGIES IN DETAILED ROUTING

BACKGROUND

The present disclosure relates generally to integrated circuit design, and more specifically, to sharing global route topologies in global and detailed routing.

The design of the layout of an integrated circuit typically includes both global routing and detailed routing. Global routing is used to find a rough path for each net by defining routing regions and generating a tentative route that specifies a set of routing regions traversed for each net being routed. During the global routing process, each net is assigned to a set of routing regions, however the actual layout of wires is not specified. The actual layout of wires used by the nets is typically specified during detailed routing. During detailed routing, for each routing region, each net that passing through that region is assigned particular routing tracks and the layout of the wires is fixed.

Two strategies are often applied in state-of-the-art global and detail routing tools in order to revise and/or to repair decisions made upstream in the flow: rip-up-and-reroute; and incremental updates. The initial global routing solution generated by the global routing process can create congestion and alternate global routing topologies are often searched for a set of nets in order to eliminate congestion. Even if global routing is successful, detailed routing is often not able to close all connections, and alternative detailed routing paths are searched in order to find a connected detailed routing solution. It can be time-consuming and not always possible to find alternate routes (global, detail) using the rip-up-and-reroute strategy and/or the incremental update strategy.

SUMMARY

Embodiments include a method, system, and computer program product for sharing global routing topologies in global and detailed routing during integrated circuit design. The method includes accessing, using a processor, an initial layout of global wires and a congestion related metric for each net in a gate level design description of an integrated circuit. The initial layout was created by a global router based on the gate level design description, the initial layout of wires specifying connections between regions on the integrated circuit. A second layout that specifies, for each net, detailed routing information including connections between specific wires in the regions of the integrated circuit is accessed using a processor. The second layout was created by a detailed router based on the initial layout and includes a failing net that is missing a connection in the second layout between two of the regions. A list of nets with a same source region and target region in the initial layout as the failing net is generated. A net in the list of nets is selected and the failing net is rerouted over the selected net. The rerouting includes the global router updating the initial layout and the detailed router updating the second layout. The congestion related metric for each net is updated in response to the global router updating the initial layout.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments described herein are directed to sharing global route topologies in detailed routing during the design of the layout of an integrated circuit. Embodiments provide an integrated method that does not require execution of costly rip-up-and-reroutesequences or incremental update algorithms to provide an alternative solution, or alternate path, to a global or detailed router. As described herein, global routing topology from other nets in the integrated circuit are shared and used for rerouting a failed net. Embodiments can be utilized in a variety of environments, such as, but not limited to bus-like structures where several connections may leave the same source area and approach the same sink, or destination, area.

Nets can be assigned to different global routes, or paths, even if their source and destinations are almost in the same location on the integrated circuit. If a net A fails to route and there is another net B which has almost the same source and target locations, then in one or more embodiments described herein, the global topology of net B can be shared to find an alternative topology for net A to use to resolve the problem. In accordance with one or more embodiments, after global routing, a congestion related metric such as a topology sharing score (TS score) is calculated for each global routed net in order to pick the best suitable alternative topology for nets that fail in global routing (e.g., congestion) or detailed routing (e.g., opens). The TS score, which is also referred to herein as a weighted congestion score and is an example of a congestion related metric, can depend on various factors, such as congestion values, scenic ratio, and net weight. In accordance with one or more embodiments, when looking for alternative routes, the best suitable alternative topology is selected based on the TS score of a global net. In one or more embodiments, the alternative routes are evaluated in order of their TS scores, with alternative routes with the best TS scores (e.g. lowest weighted congestion score) being evaluated before alternative routes with other TS scores (e.g. higher weighted congestion score). Thus, given two alternative routes that can both fix a fail in global or detailed routing, the alternate route with the best TS score is considered the best alternate route.

Figure 1:
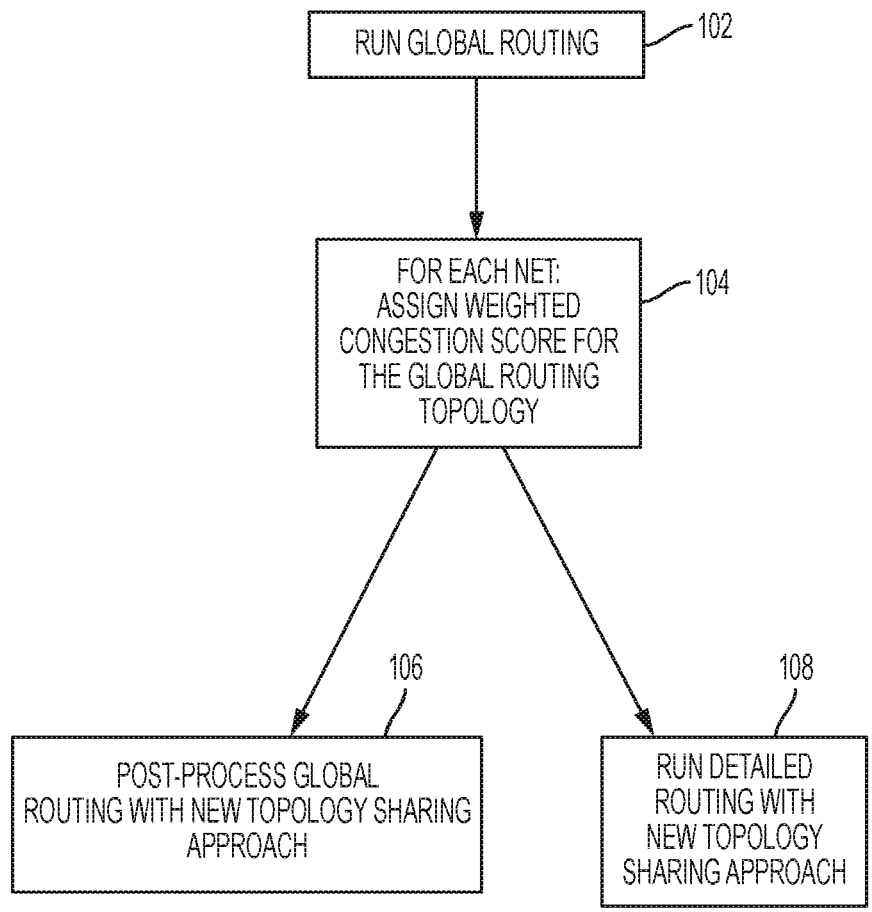
FIG. 1 depicts a flow diagram of a process for sharing global route topologies in global and detailed routing in accordance with one or more embodiments.

Turning now to FIG. 1, a flow diagram of a process for sharing global route topologies in detailed routing during integrated circuit design is generally shown in accordance with one or more embodiments. At block 102, global routing is run using, for example a resource sharing algorithm, multi-commodity-flow approximation algorithm and integer linear programming. A global router is a coarse level routing engine which divides the entire chip area in small regions in form of global tiles (also referred to herein as "regions"). It takes a placement netlist as an input and runs global routing on the nets in the design. It produces an output netlist which has all the nets global routed and it is passed as an input to detail router.

At block 104 a weighted congestion score for the global routing topology is assigned to each net in the global layer. In one or more embodiments, the global weighted congestion score, or TS score, for a net is computed by weighting with the input weight of the net, average congestion values along a path taken by the net from source region to target region and maximum congestion values along the path from source region to target region. The weighted congestion score is an example of a congestion metric and is a measure of edge congestion. Another example of a congestion metric is total overflow score which measures how many wires exceed the capacity of an edge. Once block 104 completes, processing can continue at block 106 or block 108.

At block 106, the global routing is post-processed with the new global topology sharing approach. As used herein, the term "global topology sharing approach" refers to sharing the same global routing topology with another net in order to fix a problem in consideration (such like an overflow in global routing or an open in detailed routing). At block 106, for global routing, some global wires can be removed and rerouted according to the selection based on best score. At block 108, the detailed routing is run with the new global topology sharing approach.

Thus, embodiments described herein can be applied to both global routing and detailed routing. Embodiments can be applied to global routing (in a kind of post-processing step) to find better topologies to fix problems such as, but not limited to, congestion spots. Embodiments can be applied to detailed routing in order to fix problems such as, but not limited to, open connections.

Figure 2:
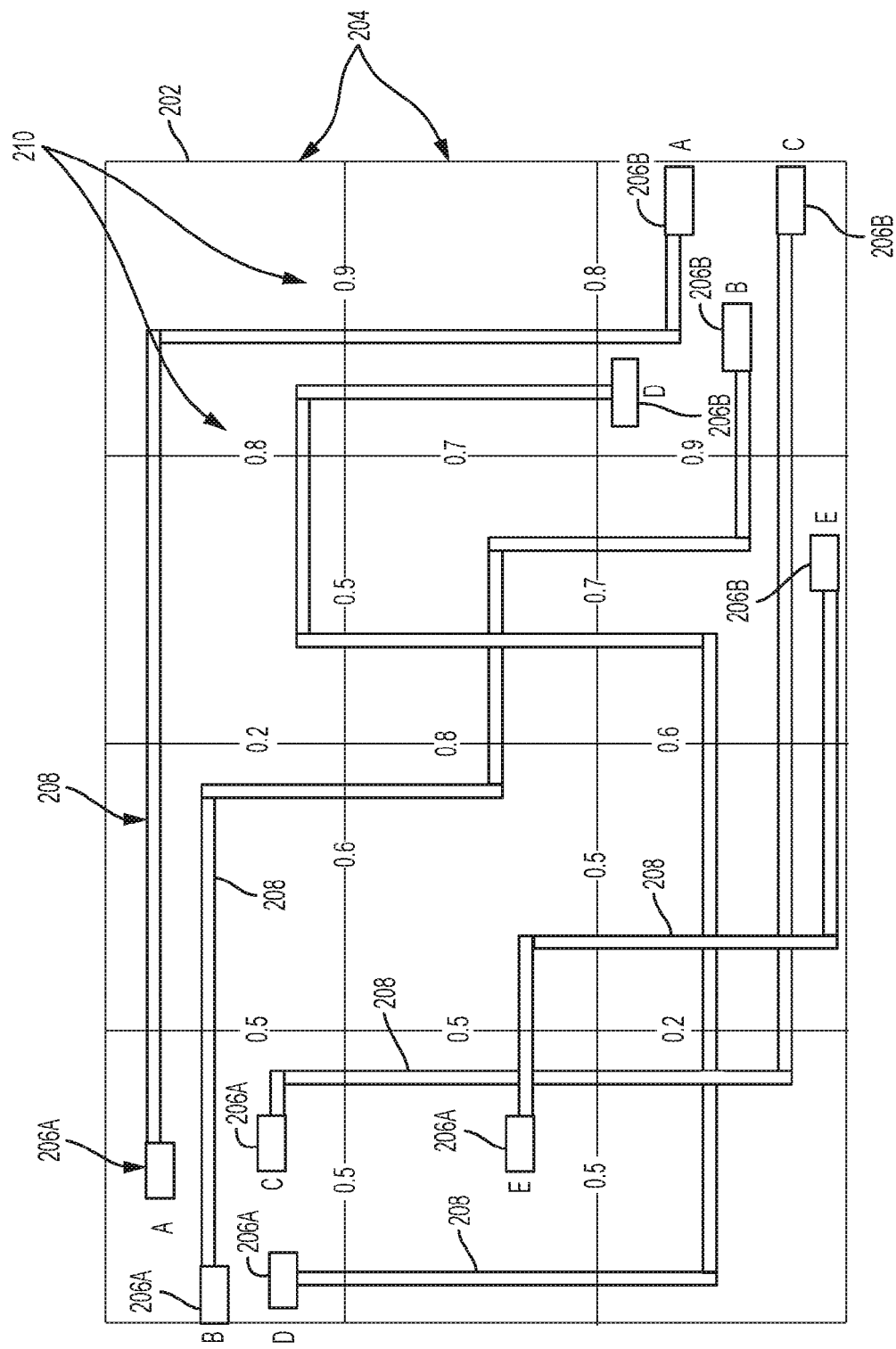
FIG. 2 depicts a block diagram of the result of a global routing of global wires of five nets across an integrated circuit having multiple regions in accordance with one or more embodiments.

Turning now to FIG. 2, a block diagram of a global routing of global wires 208 of five nets across an integrated circuit 202 having multiple regions 204 is generally shown in accordance with one or more embodiments. FIG. 2 includes an integrated circuit 202 made up of a plurality of regions 204. As shown in FIG. 2 the path of each net (A,B,C,D,E) is depicted as global wires 208 that traverse the regions 204 to connect a source pin 206A to a target pin 206B. Also shown in FIG. 2 are congestion values 210 at the edges of each region 204. The congestion values 210 indicate how many global wires 208 cross from one region into the adjacent region. Generally, a higher congestion value 210 indicates more traffic across the edge. As shown in FIG. 2, nets A, B, C, and D take different paths and traverse different regions 204, however they all start in the same source region 204 and end in the same target region 204. The regions 204 shown in FIG. 2 can be referred to as tiles. In one or more embodiments, the global routing shown in FIG. 2 is generated based on a gate level design description of the integrated circuit 202.

Figure 3:
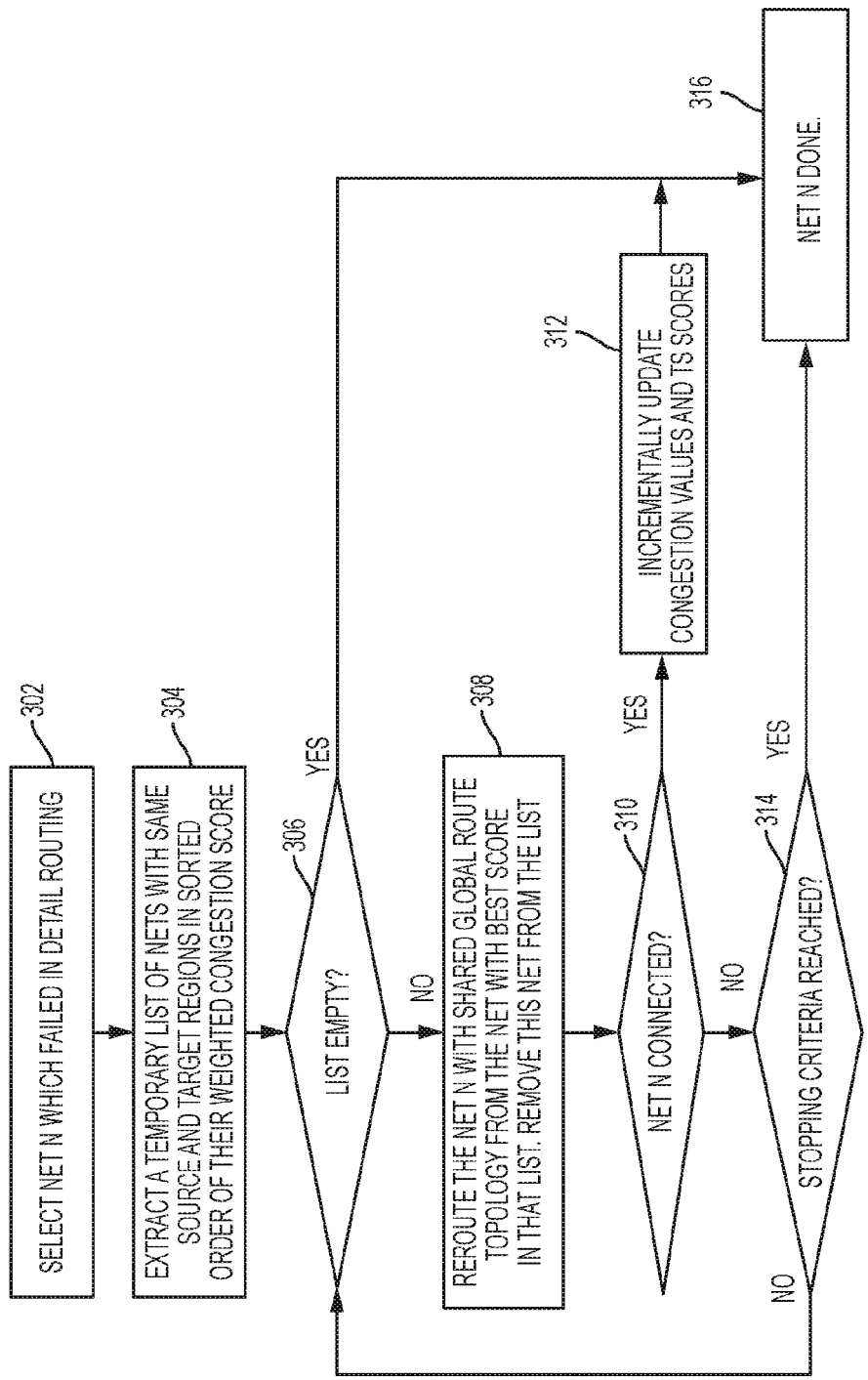
FIG. 3 depicts a flow diagram of a process that is applied to failing nets in detailed routing in accordance with one or more embodiments.

Turning now to FIG. 3, a flow diagram of a process that can be applied to failing nets in detailed routing is generally shown in accordance with one or more embodiments. At block 302, a net N, which failed in detailed routing is selected. In one or more embodiments, an initial layout of global wires (such as that shown in FIG. 2) and a weighted congestion score as described previously are accessed for each net. In addition, a second layer that was created by a detailed router and that specifies detailed routing information for each net is accessed. The second layer includes connections between specific wires in the regions 204 of the integrated circuit 202.

At block 304, a list of nets on the integrated circuit 202 having the same source and target regions as the failing net N is extracted and sorted in order of their weighted congestion scores. In one or more embodiments, the extracting and sorting is further restricted based on other net specific properties such as, but not limited to: same layer assignment, and same or better target length ratio. It is determined at block 306, whether the list is empty. If the list is empty, then there are no nets to use for the rerouting on net N and processing continues at block 316, where the processing is completed. If it is determined at block 306, that there are additional nets in the list, then processing continues at block 308, and the net N is rerouted with shared global route technology using the net with the best (e.g., lowest) TS score on the list. This net is then removed from the list.

At block 310, a determination is made about whether net N is connected. Net N is connected for example, when there is an unbroken path between the source pin 206A and the target pin 206B for net N in the detailed routing. If the net N is connected, then processing continues at block 312, where the congestion values 210 and TS scores (also referred to as weighted congestion scores) for the nets in the global routing are updated. In one or more embodiments, for performance reasons, the processing shown in block 312, is performed every "x" number of iterations, where x is greater than one. Once block 312 completes processing, processing ends at block 316. If it is determined, at block 310, that the net N is not connected, then processing continues at block 314, where it is determined whether specified stopping criteria has been reached. In one or more embodiments, the stopping criteria can include, but is not limited to a number of passes of performed iterations or a runtime limit. Processing continues at block 316 to stop the processing if it is determined at block 314 that the stopping criteria has been met. When processing ends without finding an alternate path, then incremental routing and rip-up-sequences may be performed. Otherwise, if the stopping criteria has not been met, processing continues at block 306 to consider another net in the list. In accordance with one or more embodiments, this cycle of blocks 306 through 314 continues until either net N is connected, the list of nets is empty, or a stopping criteria has been met.

In one or more embodiments, the selecting includes iterating through the list of nets in order of congestion score until either a net that corrects the failing net is identified or there are no more nets in the list of nets. In one or more embodiments, additional criteria, referred to herein as stopping criteria can also cause the processing shown in FIG. 3 to end at block 316.

In one or more embodiments, a congestion value for each pair of adjacent regions in the integrated circuit is calculated. In one or more embodiments, a weighted congestion score for each net is computed by: computing an average of the congestion values along a path of the net from source region to target region; computing a maximum value of the congestion values along the path of the net from the source region to the target region; and weighting the average and maximum congestion values along with an input weight of the net to generate the weighted congestion score for the net.

Figure 4:
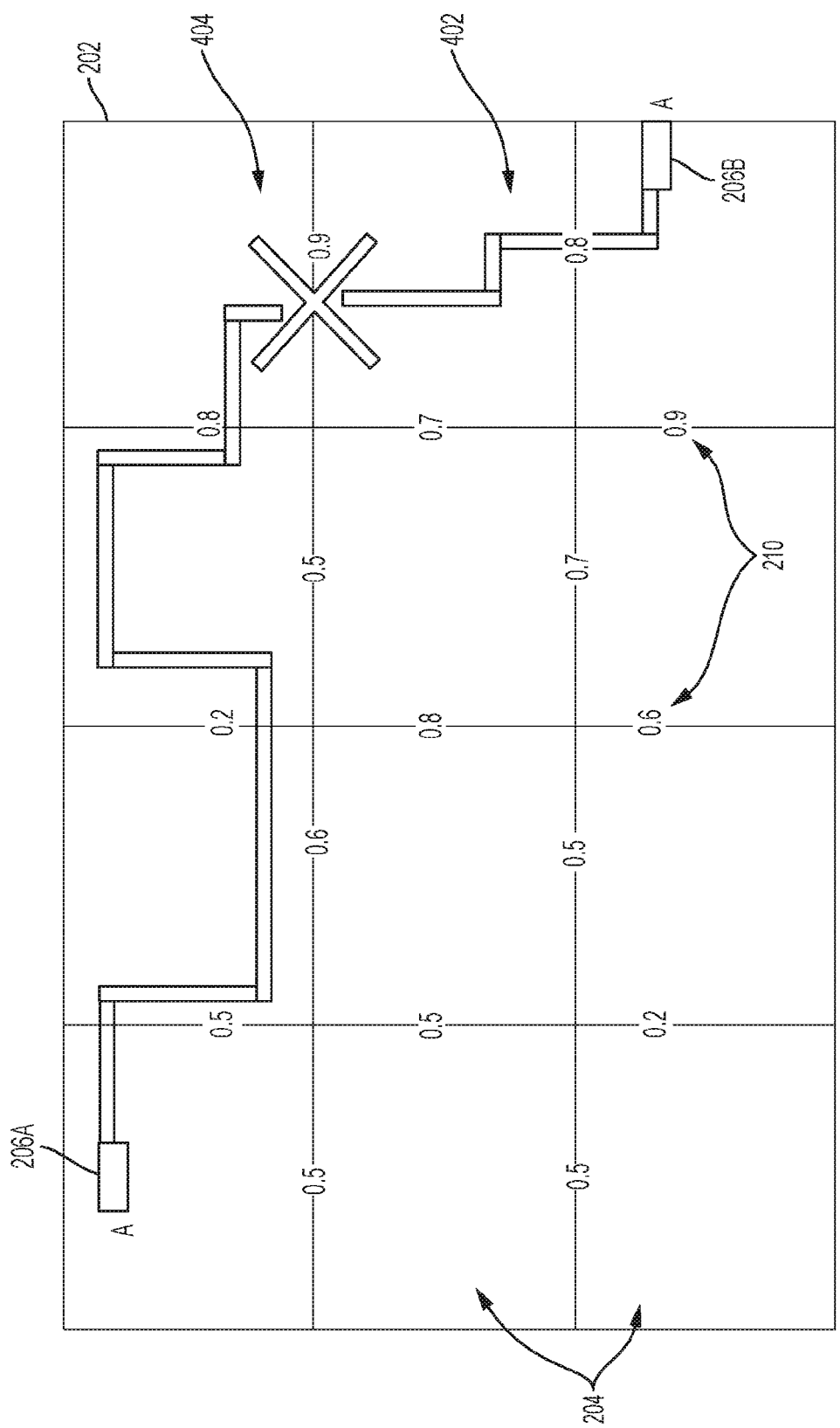
FIG. 4 depicts a block diagram of the result of detailed wires of a net failing during detailed routing in accordance with one or more embodiments.

Turning now to FIG. 4, a block diagram of detailed wires 402 of a net failing during detailed routing is generally shown in accordance with one or more embodiments. FIG. 4 shows a break 404 in the detailed routing of net A from FIG. 2, due for example to the congestion value between the edge already being at it maximum limit according to global routing guidelines. In accordance with one or more embodiments, a list of nets with the same source and target regions 204 as net A is extracted. Referring back to FIG. 2, nets B, C, and D all have the same source and target regions 204 as net A and are potential candidates.

In accordance with one or more embodiments, only nets B and C are put on the list and net D is discarded due to not meeting a wire length constraint. Congestion metrics are calculated for nets B and C to determine which on is the best alternative path for net A. In one or more embodiments the congestion metrics include weighted congestion scores that are calculated as follows for net B. Referring back to FIG. 2, the average congestion for net B is calculated by adding up the congestion values on each edge that net B passes through and dividing by the number of edges ((0.5+0.6+0.8+0.7+0.9)/5=3.5/5=0.7). The maximum congestion for net B is 0.9. The average congestion for net C is calculated by adding up the congestion values on each edge that net C passes through and dividing by the number of edges ((0.5+0.5+0.2+0.6+0.9)/5=2.7/5=0.54). The maximum congestion for net C is 0.9. In one or more embodiments, the net with the lowest maximum congestion value is selected and if there is a tie, the net the lowest average congestion is selected. In this example, nets B and C have the same maximum congestion, and net C has a lower average congestion so net C is selected as the best alternative path for net A and is applied first. Net B can be chosen as a second alternative if rerouting net A over net C does not result in a closed detailed routing path for net A.

Figure 5:
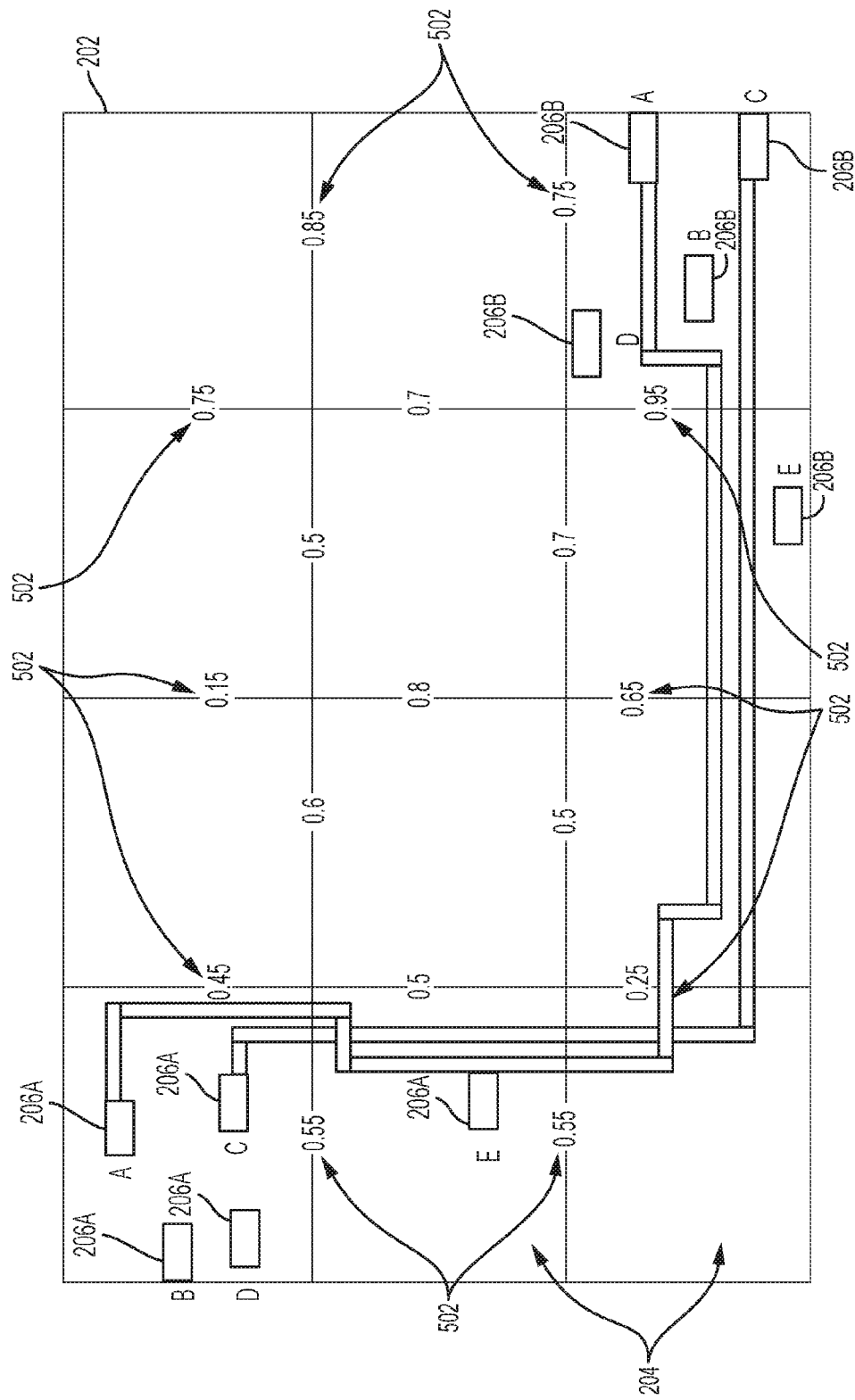
FIG. 5 depicts a block diagram of detailed wires in a net after a rerouting has been performed in accordance with one or more embodiments.

Turning now to FIG. 5, a block diagram of detailed wires of a rerouted net that failed during detailed routing is generally shown in accordance with one or more embodiments. As shown in FIG. 5, net A is routed through the same regions 204 that net C is routed. In addition, congestion values 502 impacted by the change in routing are updated.

In one or more embodiments, a net that causes a design rule violation for the global, or initial, layout is identified. Similar to the process described above, a list is generated containing nets with the same source region and target region in the initial layout as the identified net. A net in list of nets is selected and the identified net is rerouted over the selected net. The rerouting includes the global router updating the initial layout as well as the congestion metric for each net. In one or more embodiments, the design rule violation can include, but is not limited to a congestion violation, a length violation, and a timing violation.

Figure 6:
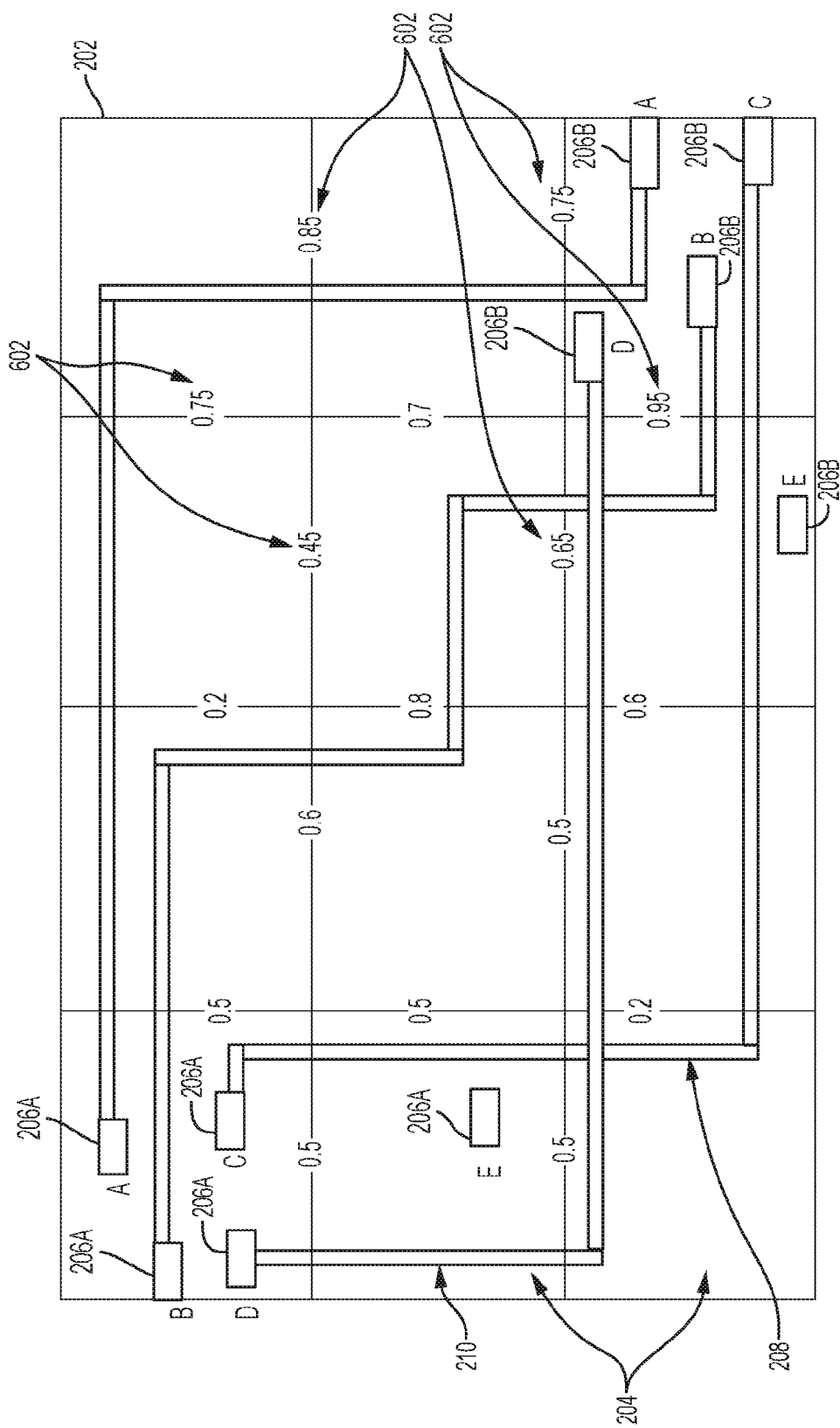
FIG. 6 depicts a block diagram of global wires of a rerouted net in accordance with one or more embodiments.

Turning now to FIG. 6, a block diagram of global wires of a rerouted net is generally shown in accordance with one or more embodiments. FIG. 6 shows that the length of the global routing of net D has been shortened (as compared to net D in FIG. 2) by rerouting net D through the same regions 204 as net C. In this manner, net D can provide better performance and/or avoid a design rule violation having to do with the length of net D. In accordance with one or more embodiments, a list of nets with the same source and target regions 204 as net D is extracted. Referring back to FIG. 2, nets A, B, and C all have the same source and target regions 204 as net D and are potential candidates.

Congestion metrics are calculated for nets A, B, and C to determine which one is the best alternative path for net D. In one or more embodiments the congestion metrics include weighted congestion scores that are calculated as follows for net A. Referring back to FIG. 2, the average congestion for net A is calculated by adding up the congestion values on each edge that net A passes through and dividing by the number of edges ((0.5+0.2+0.8+0.9+0.8)/5=3.2/5=0.64). The maximum congestion for net A is 0.9. The average congestion for net B is calculated by adding up the congestion values on each edge that net B passes through and dividing by the number of edges ((0.5+0.6+0.8+0.7+09)/5=3.5/5=0.7). The maximum congestion for net B is 0.9. The average congestion for net C is calculated by adding up the congestion values on each edge that net C passes through and dividing by the number of edges ((0.5+0.5+0.2+0.6+0.9)/5=2.7/5=0.54). The maximum congestion for net C is 0.9.

In one or more embodiments, the net with the lowest maximum congestion value is selected and if there is a tie, the net the lowest average congestion is selected. In this example, nets A, B and C have the same maximum congestion, and net C has a lower average congestion so net C is selected as the best alternative path for net D and is applied first. Net A can be chosen as a second alternative and net B as a third alternative.

In one or more embodiments, the processing described herein is only applied to two-pin-nets, that is, nets having exactly two pin connections. The majority of nets on an integrated circuit have got two pins only. Therefore, embodiments can be applied to these two-pin-nets while treating multi-pin-nets with convention methods.

In other embodiments, n-pin-nets are split into a set of two-pin-nets. Multi-pin-nets with n pins and m Steiner points can be split into n+m−1 many 2-pin-subnets. Embodiments described herein can then be applied to these subnets.

In one or more embodiments, the 2-pin approach is generalized to an n-pin approach where all n regions (rather than just two) are taken into account to group nets. For example, referring back to FIG. 6, net A and net B would be sorted into the same bucket only if all of their pins belonged to the same regions 204. This includes the source pins 206A and target pins 206B, as well as any intermediate pins that nets A and B traverse. Also referring back to FIG. 6, in an embodiment where all n regions are taken into account to group nets, net A and net C could be sorted into different buckets because their intermediate pins do not belong to the same regions 204.

Figure 7:
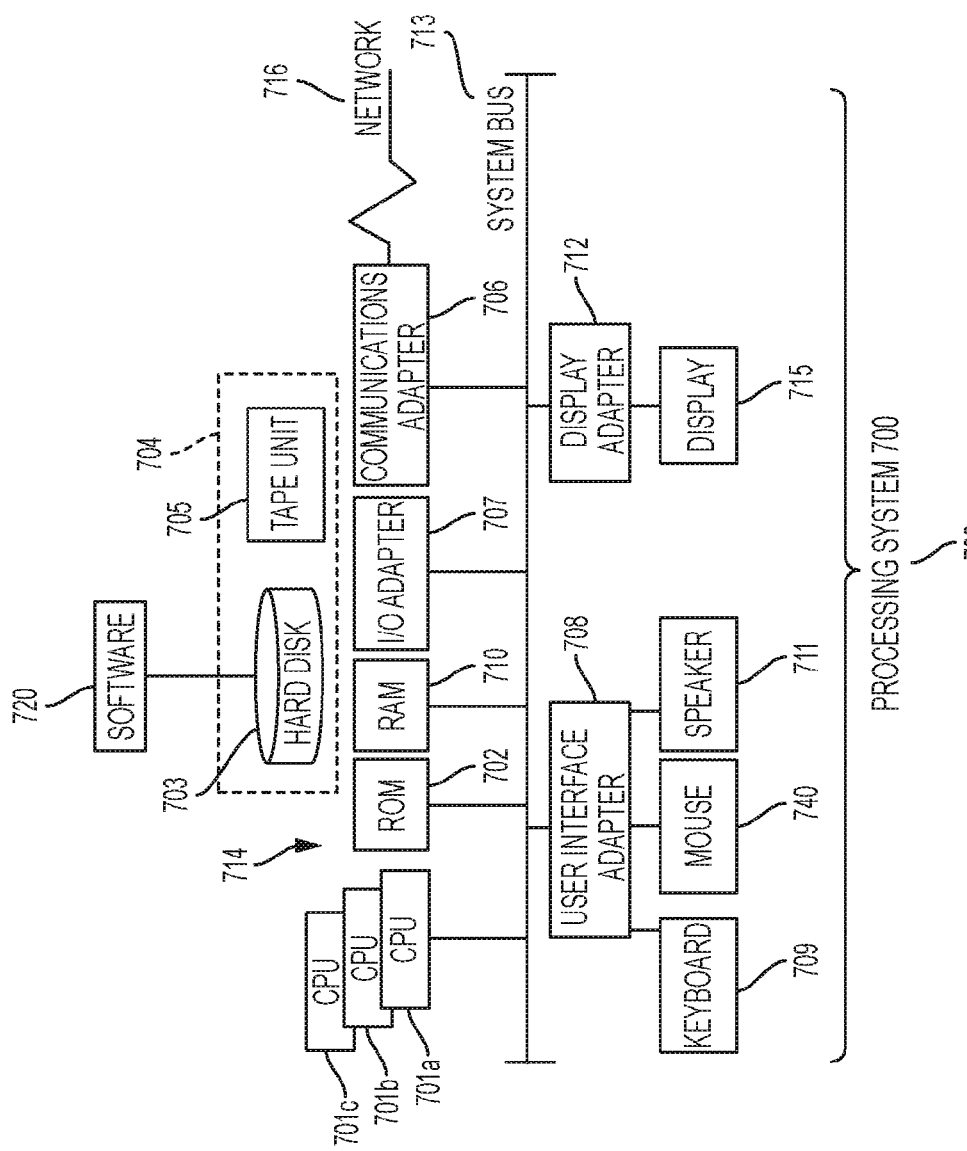
FIG. 7 depicts a processing system for text for sharing global route topologies during integrated circuit design in accordance with one or more embodiments.

Turning now to FIG. 7, a processing system 700 for sharing global route topologies in detailed routing is generally shown in accordance with one or more embodiments. In this embodiment, the processing system 700 has one or more central processing units (processors) 701a, 701b, 701c, etc. (collectively or generically referred to as processor(s) 701). Processors 701, also referred to as processing circuits, are coupled to system memory 714 and various other components via a system bus 713. Read only memory (ROM) 702 is coupled to system bus 713 and may include a basic input/output system (BIOS), which controls certain basic functions of the processing system 700. The system memory 714 can include ROM 702 and random access memory (RAM) 710, which is read-write memory coupled to system bus 713 for use by processors 701.

FIG. 7 further depicts an input/output (I/O) adapter 707 and a network adapter 706 coupled to the system bus 713. I/O adapter 707 may be a small computer system interface (SCSI) adapter that communicates with a hard disk 703 and/or tape storage drive 705 or any other similar component. I/O adapter 707, hard disk 703, and tape storage drive 705 are collectively referred to herein as mass storage 704. Software 720 for execution on processing system 700 may be stored in mass storage 704. The mass storage 704 is an example of a tangible storage medium readable by the processors 701, where the software 720 is stored as instructions for execution by the processors 701 to perform a method, such as the processing described in reference to FIGS. 1-6. Network adapter 706 interconnects system bus 713 with an outside network 716 enabling processing system 700 to communicate with other such systems. A screen (e.g., a display monitor) 715 is connected to system bus 713 by display adapter 712, which may include a graphics controller to improve the performance of graphics intensive applications and a video controller. In one embodiment, adapters 707, 706, and 712 may be connected to one or more I/O buses that are connected to system bus 713 via an intermediate bus bridge (not shown). Suitable I/O buses for connecting peripheral devices such as hard disk controllers, networks, and graphics adapters typically include common protocols, such as the Peripheral Component Interconnect (PCI). Additional input/output devices are shown as connected to system bus 713 via user interface adapter 708 and display adapter 712. A keyboard 709, mouse 740, and speaker 711 can be interconnected to system bus 713 via user interface adapter 708, which may include, for example, a Super I/O chip integrating multiple device adapters into a single integrated circuit.

Thus, as configured in FIG. 7, processing system 700 includes processing capability in the form of processors 701, and, storage capability including system memory 714 and mass storage 704, input means such as keyboard 709 and mouse 740, and output capability including speaker 711 and display 715. In one embodiment, a portion of system memory 714 and mass storage 704 collectively store an operating system to coordinate the functions of the various components shown in FIG. 7.

Technical effects and benefits include topology sharing of global routes during global and detailed routing. This can allow rerouting without costly rip-up-and-reroute sequences or incremental global routing.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for creating layouts of integrated circuits, the system comprising:
   a memory storing computer readable instructions; and
   a processor for executing the computer readable instructions to cause the system to perform:
   accessing an initial layout of global wires and a congestion related metric for each net in a gate level design description of an integrated circuit, the initial layout created by a global router based on the gate level design description, the initial layout of wires specifying connections between regions on the integrated circuit;
   accessing a second layout that specifies, for each net, detailed routing information including connections between specific wires in the regions of the integrated circuit, the second layout created by a detailed router based on the initial layout and including a failing net that is missing a connection in the second layout between two of the regions;
   generating a list of nets with a same source region and target region in the initial layout as the failing net;
   selecting a net in the list of nets;
   rerouting the failing net over the selected net, the rerouting comprising the global router updating the initial layout and the detailed router updating the second layout;
   updating the congestion related metric for each net in response to the global router updating the initial layout; and
   causing the integrated circuit to be fabricated based at least in part on the updated initial layout and the updated second layout.

2. The system of claim 1, wherein the selecting comprises iterating through the list of nets in an order determined by the congestion related metrics until one of a net that corrects the failing net is identified and there are no more nets in the list of nets.

3. The system of claim 1, wherein the instructions further cause the system to compute a congestion value for each pair of adjacent regions, wherein the congestion value is input to the selecting and the rerouting.

4. The system of claim 1, wherein the instructions further cause the system to compute a weighted congestion score as the congestion metric for each net, the computing comprising:
   computing a congestion value for each pair of adjacent regions that reflects a number of connections between the pair;
   computing an average of the congestion values along a path of the net from source region to target region;
   computing a maximum value of the congestion values along the path of the net from the source region to the target region; and
   weighting the average and maximum congestion values along with an input weight of the net to generate the weighted congestion score for the net.

5. The system of claim 1, wherein each net has two pin connections.

6. The system of claim 1, wherein each net has at least three pin connections.

7. The system of claim 1, wherein the instructions further cause the system to perform:
   identifying a net which causes a design rule violation for the initial layout;

generating a second list of nets with the same source region and target region in the initial layout as the identified net;

selecting a second net in the second list of nets;

rerouting the identified net over the second selected net, the rerouting comprising the global router updating the initial layout; and updating the congestion related metric for each net in response to rerouting the identified net over the second selected net.

8. The system of claim 7, wherein the design rule violation is selected from the group consisting of a congestion violation, a length violation, and a timing violation.

9. A computer program for creating layouts of integrated circuits, the computer program product comprising:

a tangible storage medium readable by a processor and storing instructions executable by the processor for:

accessing, using a processor, an initial layout of global wires and a congestion related metric for each net in a gate level design description of an integrated circuit, the initial layout created by a global router based on the gate level design description, the initial layout of wires specifying connections between regions on the integrated circuit;

accessing, using the processor, a second layout that specifies, for each net, detailed routing information including connections between specific wires in the regions of the integrated circuit, the second layout created by a detailed router based on the initial layout and including a failing net that is missing a connection in the second layout between two of the regions;

generating a list of nets with a same source region and target region in the initial layout as the failing net;

selecting a net in the list of nets;

rerouting the failing net over the selected net, the rerouting comprising the global router updating the initial layout and the detailed router updating the second layout;

updating the congestion related metric for each net in response to the global router updating the initial layout; and causing the integrated circuit to be fabricated based at least in part on the updated initial layout and the updated second layout.

10. The computer program product of claim 9, wherein the selecting comprises iterating through the list of nets in an order based on the congestion related metrics until one of a net that corrects the failing net is identified and there are no more nets in the list of nets.

11. The computer program product of claim 9, wherein the instructions are further executable for computing a congestion value for each pair of adjacent regions, wherein the congestion value is input to the selecting and the rerouting.

12. The computer program product of claim 9, wherein the instructions are further executable for:

identifying a net which causes a design rule violation for the initial layout;

generating a second list of nets with the same source region and target region in the initial layout as the identified net;

selecting a second net in the second list of nets;

rerouting the identified net over the second selected net, the rerouting comprising the global router updating the initial layout; and updating the congestion related metric for each net in response to rerouting the identified net over the second selected net.

* * * * *